(12) United States Patent
Ensenat De Carlos

(10) Patent No.: US 8,567,428 B2
(45) Date of Patent: Oct. 29, 2013

(54) SYSTEM FOR SUPPLYING FERTILIZERS VIA IRRIGATION WATER

(76) Inventor: Luz Ensenat De Carlos, Madrid (ES)

( * ) Notice: Subject to any disclaimer, the term of this patent is extended or adjusted under 35 U.S.C. 154(b) by 259 days.

(21) Appl. No.: 12/991,363

(22) PCT Filed: May 5, 2008

(86) PCT No.: PCT/ES2008/000307
§ 371 (c)(1),
(2), (4) Date: Jan. 11, 2011

(87) PCT Pub. No.: WO2009/135955
PCT Pub. Date: Nov. 12, 2009

(65) Prior Publication Data
US 2011/0155261 A1   Jun. 30, 2011

(51) Int. Cl.
*E03C 1/046* (2006.01)

(52) U.S. Cl.
USPC ............ 137/268; 422/264; 422/282; 239/310

(58) Field of Classification Search
USPC ............ 137/268; 422/264, 282, 275; 239/310
See application file for complete search history.

(56) References Cited

U.S. PATENT DOCUMENTS

| | | | | |
|---|---|---|---|---|
| 4,357,953 A | * | 11/1982 | Patterson | 137/268 |
| 6,173,732 B1 | * | 1/2001 | Davis et al. | 137/268 |
| 7,712,480 B2 | * | 5/2010 | Ensenat De Carlos et al. | 137/268 |
| 7,988,929 B2 | * | 8/2011 | Limback et al. | 422/264 |

* cited by examiner

*Primary Examiner* — Kevin Lee
(74) *Attorney, Agent, or Firm* — Hoglund & Pamias, PSC; Roberto J. Rios

(57) ABSTRACT

Using as a raw material solid fertilizer housed in a tight container (1) with a hermetic closure and having a container holder in which said container can be housed in a tight-fitting manner, connected to a bypass (10-11) of the general irrigation pipe (13), such that the water diverted by said bypass penetrates the container (1), dissolves the fertilizer and exits in order to be directed back to the irrigation pipe, the invention is focused on providing a pressure regulator assembly, based on a pressure controller (23), a check valve (24), a safety valve (25) and a small pipe which opens out into a normally closed depressurization valve (26), this pressure regulator feeding a "Venturi" type fertilizer solution injector element (27), which is also connected to the upper portion of the container holder for the evacuation of air (39). A constant working pressure during the injection is thus achieved, it being furthermore possible for the injection flow rate to be regulated as desired through an injection regulator valve (12) established in the sector of the irrigation pipe (13) comprised between the branches (10) and (11) forming the bypass. The danger that the pressurized compressible fluids (38-39) may involve is also eliminated.

4 Claims, 8 Drawing Sheets

SYSTEM FOR SUPPLYING FERTILIZERS VIA IRRIGATION WATER

OBJECT OF THE INVENTION

The present invention relates to a system which has been especially designed to supply the suitable fertilizers to a determined soil surface through the water with which said surface is irrigated.

The object of the invention is that the supply of irrigation water is always accompanied by a suitable supply of fertilizer, in order for the nutrients to be homogeneously supplied to the soil throughout the entire irrigation season.

The invention provides using fertilizer substances which can be powdered, crystalline, microgranulated, granulated or compacted in one or several pieces, marketed in a tight container and which dissolve progressively upon coming into contact with water, specifically when water is circulated through the interior of said container.

The invention is comprised in the field of irrigation installations, especially in gardening irrigation installations and the like.

BACKGROUND OF THE INVENTION

The applicant is the proprietor of PCT/ES 2006/000203, which describes a method for extracting the contents from closed flexible containers through irrigation water; it also describes the device for putting said method into practice and the container used therein.

More specifically, this patent uses a tight container made of plastic material, containing fertilizer, which container is intended to be introduced into a container holder, which is in turn provided with a tight closure, based on a body and a lid, intended to be intercalated into a branch of the conduit for supplying the irrigation water, like a bypass, such that part of the water passes through the container holder, entering through its lid and exiting through its bottom, as a result of the fact that during the closing maneuver for closing same the lid and the bottom of the container break, such that as the water passes through the device the fertilizer gradually dissolves and is entrained by the water.

This basically acceptable system has in practice certain drawbacks, specifically the following:

The fertilizer is not metered as precisely as desired.

The pressure in the container holder is virtually the mains pressure, which is undesirable in certain cases, such as for example in the irrigation of large surface areas, with considerable water flow rates and high pressure levels.

The system lacks a method for evacuating the air contained in the lower part when the container holding the fertilizer is introduced and closed, and such air would accumulate, since its density is lower than that of water in the upper portion of the container holder, which can entail a risk since air is a compressible fluid and the device works under pressure.

The closure system of the containers holding the fertilizer is not the most suitable one, and the same occurs with the entrance of the water which, since it occurs through the lid of the container holder, considerably hinders the closing maneuver for closing same.

The system lacks a control of the amount of fertilizers available at all times, such that the container must be replaced according to the time it is expected to last, which is inaccurate and the intended constant feed of fertilizers is occasionally interrupted for longer or shorter time periods.

DESCRIPTION OF THE INVENTION

The system proposed by the invention, essentially based on the mentioned PCT/ES 2006/000203, fully and satisfactorily solves the problems set forth above in each and every one of the different mentioned aspects.

To that end, more specifically and according to one of the features of the invention, it has been provided that the system works at constant pressure during the injection, for which there has been provided a pressure regulator keeping the pressure constant at its outlet, regardless of the inlet pressure, a check valve located at the outlet of the device, which prevents the pressure thereof from becoming equal to that of the mains pressure by pressure equalization in the outlet hole, and a safety valve assuring that the pressure will not be exceeded in the event of a possible failure in any of the aforementioned components, which valve will open allowing the liquid contained inside the device to leak out, in the event that the pressure at which said valve is tared is exceeded.

The fertilizer solution injector element is based on the Venturi principle and is especially designed to work on pressure during the injection and to minimize the pressure drops of the system. It is connected to the inlet pipe, to the outlet pipe, to the outlet of the extraction cavity, to the depressurization drain cock and to the upper portion of the lower part, which allows the evacuation of the air accumulated in this area after changing the container.

According to another feature of the invention, it has been provided that both the entrance and the exit of water are established at the bottom of the container and at the bottom of the container holder, the bottom of the container breaking suitably during the closing maneuver for closing the container holder, which frees the upper lid of said container holder, for which a bayonet type closure with means facilitating the manual tightening of said lid during the closing maneuver, has been provided.

It has also been provided that the container, instead of being closed by heat sealing as in the PCT, is closed by means of irreversible tongue and groove coupling, which simplifies the closing process since the use of thermal machines is not necessary.

Finally and according to another feature of the invention, the incorporation into the device of a peephole has been provided, which peephole allows viewing the mixture exiting the vessel, such that while there is fertilizer in said vessel the mixture will be colored, but as soon as the fertilizer has been used up the color in the mentioned peephole will disappear.

DESCRIPTION OF THE DRAWINGS

To complement the description which is being made and for the purpose of aiding to better understand the features of the invention according to a preferred practical embodiment thereof, a set of drawings is attached as an integral part of said description, in which the following has been depicted with an illustrative and non-limiting character.

PREFERRED EMBODIMENT OF THE INVENTION

Figure 4:
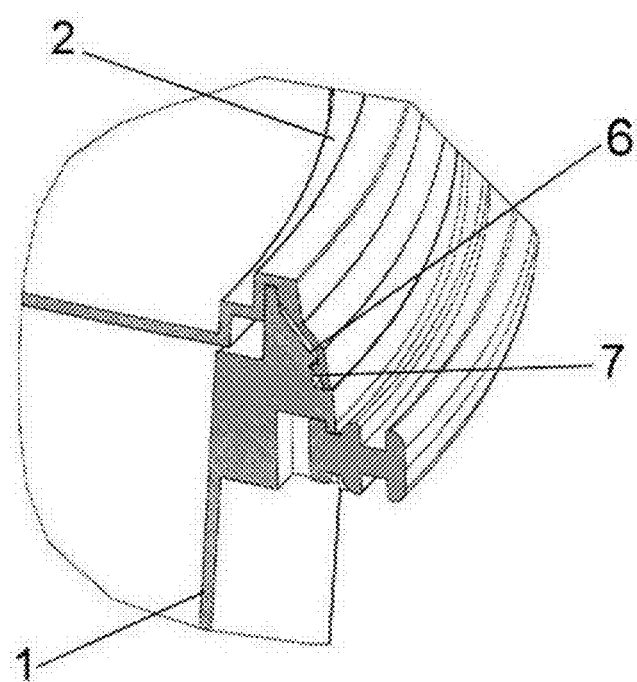
FIG. 4 is an enlarged view of the hermetic closure system of the container according to an embodiment of the invention.

In view of the indicated figures it can be observed how a container (1) participates in the system for supplying fertilizers through irrigation water proposed by the invention, which container configures a sort of tub, with the suitable capacity, with its corresponding lid (2), which further incorporates a handle (3) for facilitating its manipulation, said container holding the soluble fertilizer (4) and being hermetically closed by means of the pressurized tongue and groove coupling shown in FIG. 4, which facilitates the assembly of the lid by simple pressure, but which prevents the uncoupling thereof, acting as a seal.

The mentioned FIG. 4 shows how in the mouth of the body (1) there are defined downwardly and outwardly inclined spikes (6) with a lower straight step, whereas in the lid (2) there are spikes (7) with the opposite direction which slide relatively easily onto the spikes (6) but which are irremovably locked to the latter in a limit closing situation.

Figure 1:
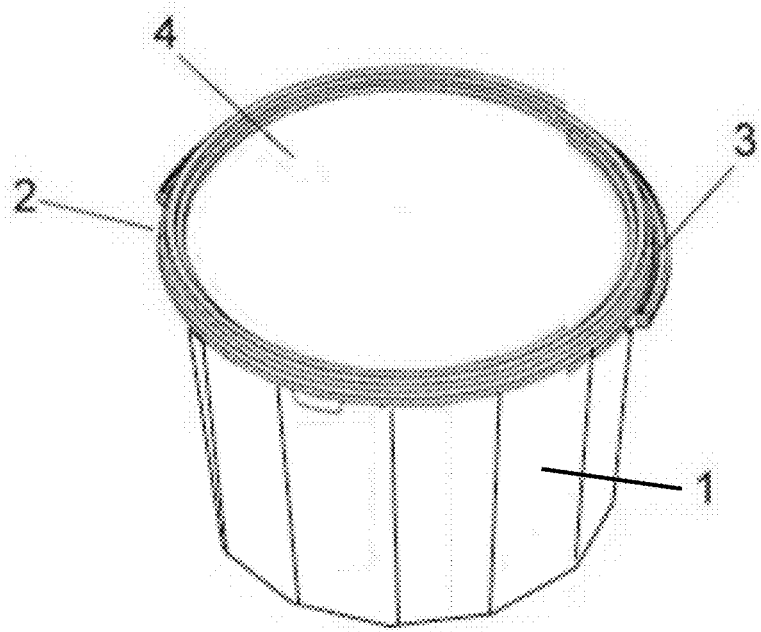
FIG. 1 is a depiction of the container full of crystalline fertilizer according to the invention.
Figure 2:
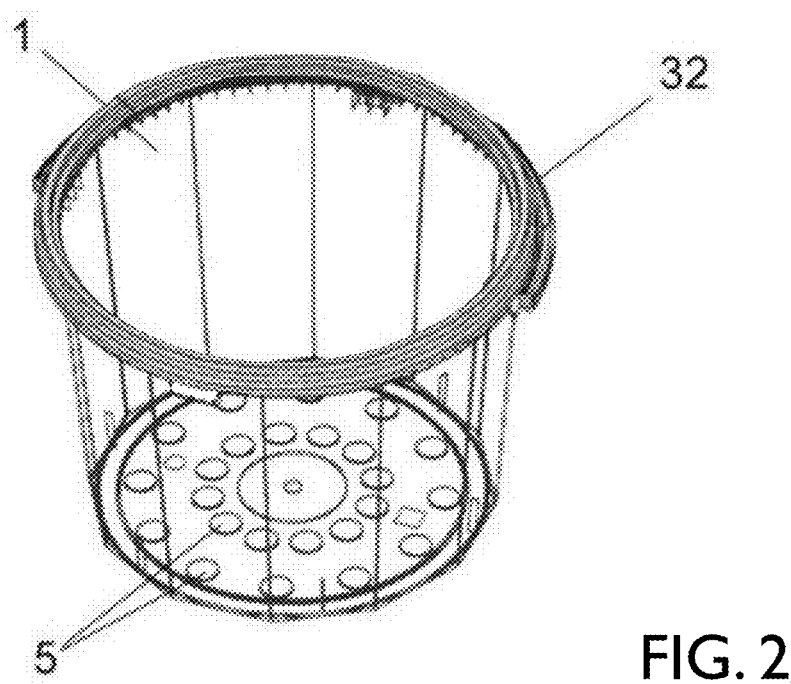
FIG. 2 is a depiction of the empty container according to the invention.
Figure 3:
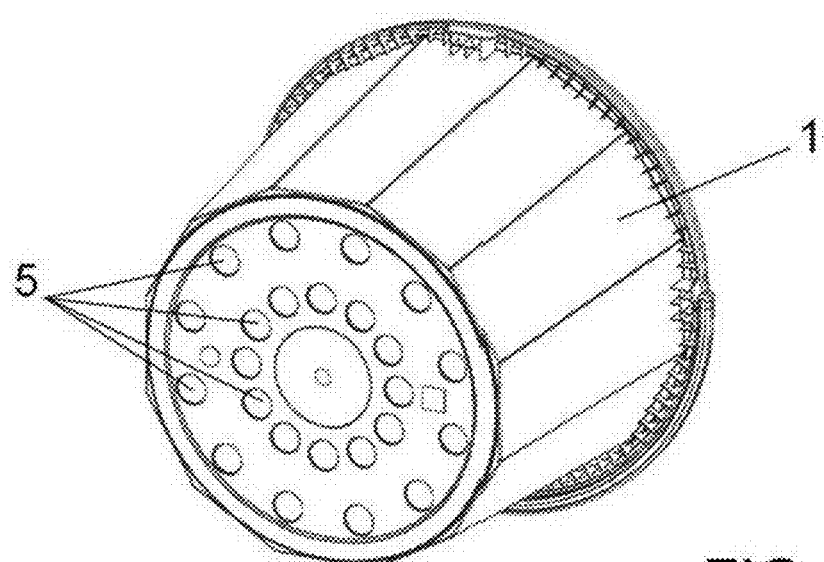
FIG. 3 is a depiction of the base of the container (tub), indicating its weak portions to facilitate the perforation thereof.

To open the container (1) and as shown in FIG. 3, a plurality of weakened areas (5) are established at the base thereof, which weakened areas facilitate the perforation thereof during the closing maneuver for closing the container holder, the perforations for injecting water and extracting the fertilizer solution being obtained regardless of the position in which the container is introduced, as will be seen below.

Figure 5:
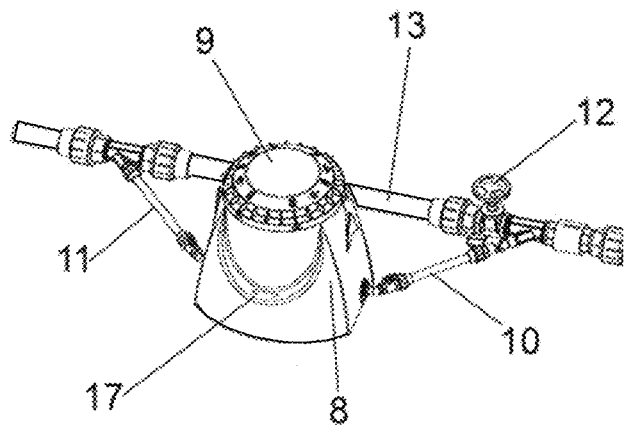
FIG. 5 is an overall view of the system.
Figure 6:
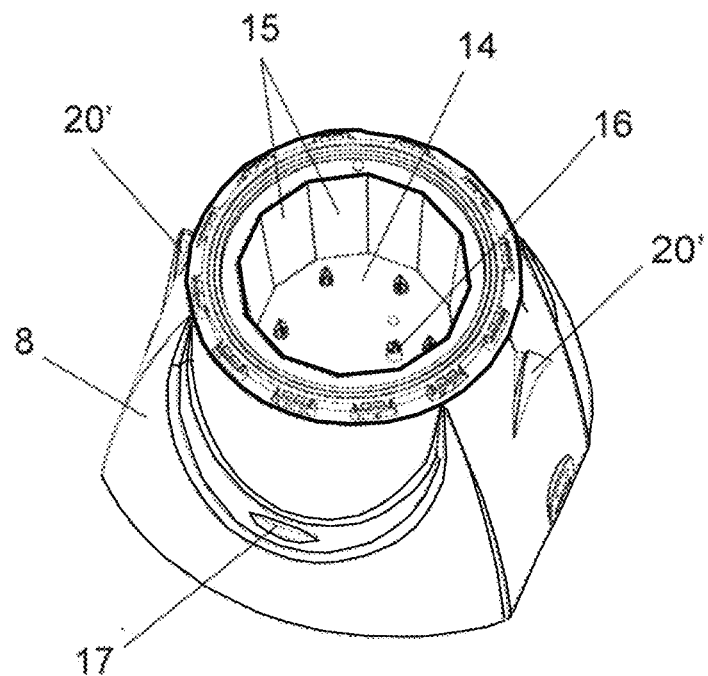
FIG. 6 is a depiction of the lower part or base of the device, showing its upper cavity (extraction cavity) with the fertilizer solution injector element and the perforation plate therein.
Figure 7:
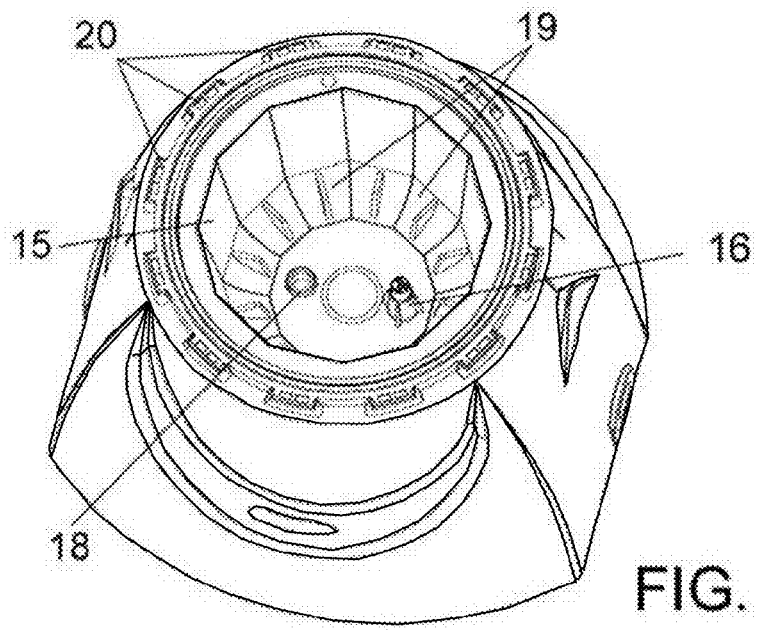
FIG. 7 is another depiction of the base of the device, showing its extraction cavity with the injector element and the outlet hole for the fertilizer solution.

In relation to the container holder and as shown especially in FIGS. 5, 6 and 7, it has a lower part or body (8), closable by means of the lid (9), said body (8) having an inlet pipe (10) and an outlet pipe (11) which, together with the container holder itself, determine a bypass for the main water circulation pipe (13), which pipe incorporates an injection regulator valve (12) in the interval corresponding to said bypass.

In the lower part or body (8) of the container holder there is established a housing (15) for the container (1), at the bottom of which a perforation plate (14) and a water injector element (16) are placed. A peephole (17) is established in the wall of the body (8) which allows estimating the moment in which the content of the container (1), i.e. the fertilizer (4), has been used up.

Figure 15:
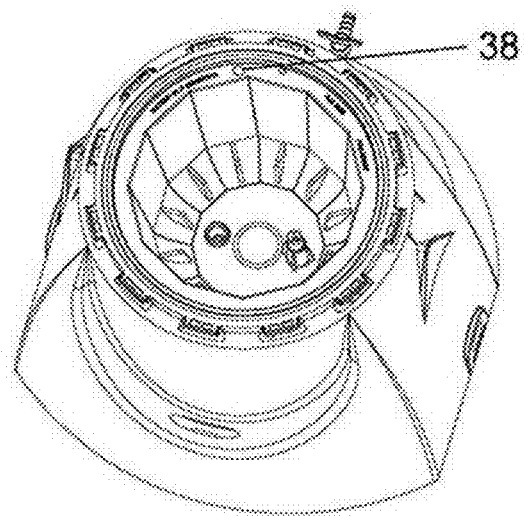
FIG. 15 shows the hole in the upper portion of the lower part of the device which will allow the evacuation of the air after changing the container.
Figure 16:
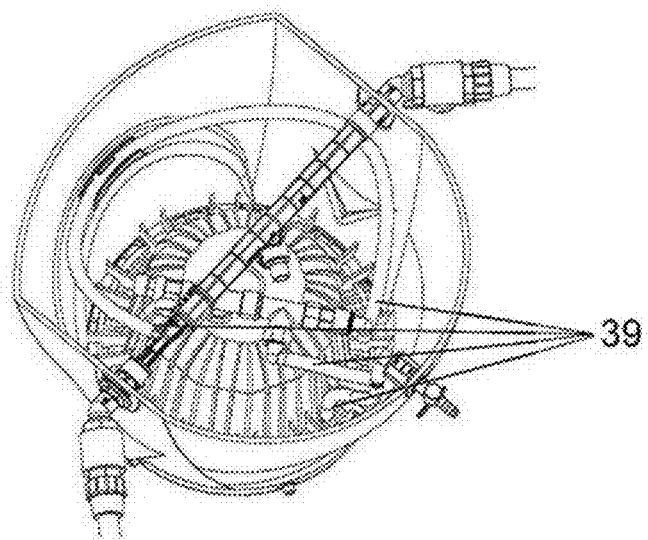
FIG. 16 consists of a depiction of the connection of the hole in the upper portion of the lower part of the device with the injection point, from where the air contained in this area will be aspirated.

Also in the mentioned cavity (15) and in addition to the water injector element (16), there is established an outlet (18) for the fertilizer solution, located below the perforation plate (14) which is supported on a plurality of ribs (19) especially visible in FIG. 7. A hole is additionally established in its upper portion (38) which is connected to the injection (39) for the evacuation of air, as can be observed in FIGS. 15 and 16.

A series of flanges (20) for the bayonet closure of the lid, which will be discussed below, is established in the opening of the body (8).

Figure 8:
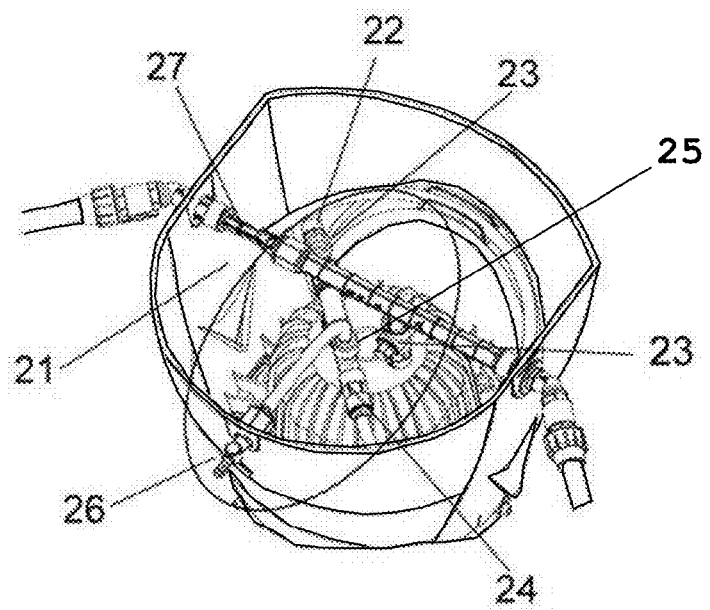
FIG. 8 is a depiction of the base of the device, showing its lower cavity with the pressure controller assembly and the injector element therein.
Figure 9:
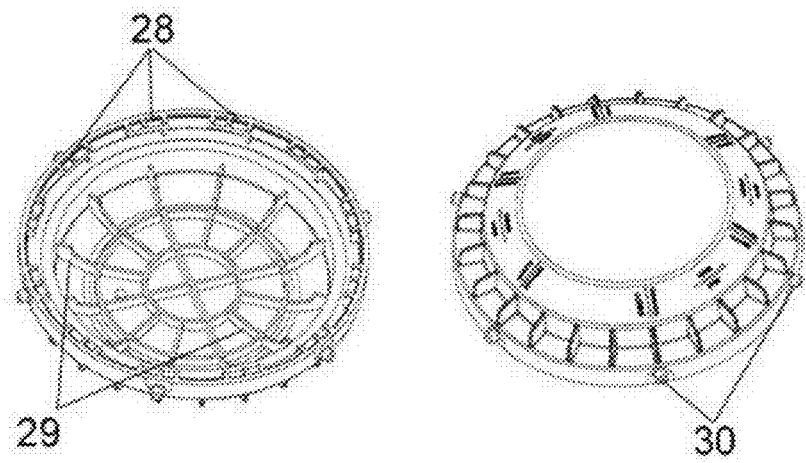
FIG. 9 is a depiction of the upper part or lid of the device, showing a system of inclined flanges complementary with those of the lower part and the projections to which the special keys will be fitted to assure the closure of the device.
Figure 10:
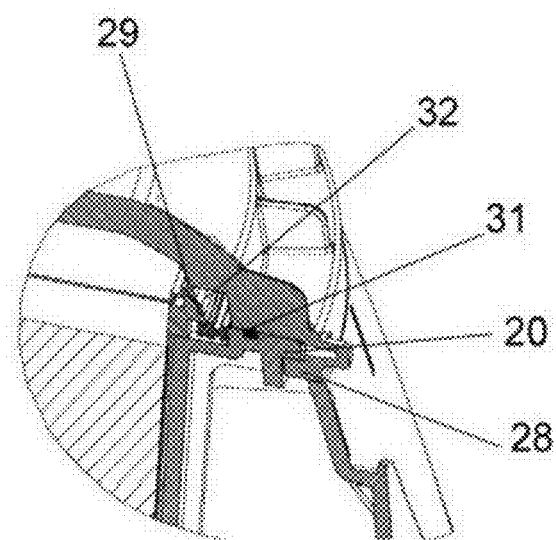
FIG. 10 is a detail of the hermetic closure system of the device, which further shows how the inner ribs of the upper part house and press the container to assure the complete perforation thereof, allowing the placement of the handle of the container.

The body base (8), below its housing (14), is hollow and defines a cavity (21) in which the pressure regulator assembly (22), indicated by means of an oval in FIG. 8, is housed, which regulator assembly is formed by a pressure controller (23), a check valve (24), a safety valve (25) and a small pipe communicated with a normally closed depressurization valve (26). The fertilizer solution injector element (27) is also placed inside this lower cavity (21).

Figure 12:
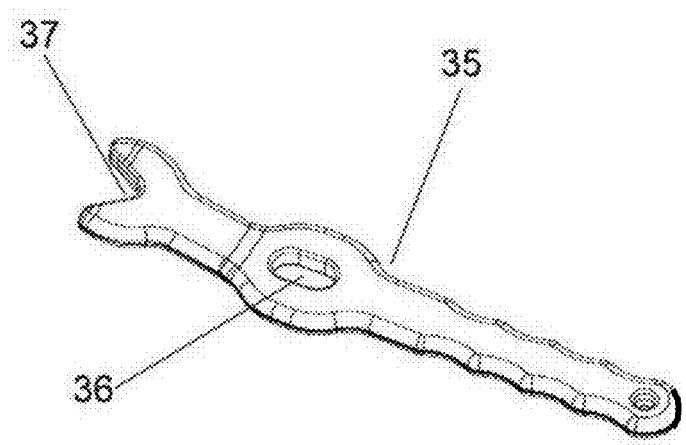
FIG. 12 is a depiction of the special keys for assuring the hermetic closure of the device, which shows the portions which are conjugated with the lower and upper parts of the device.
Figure 13:
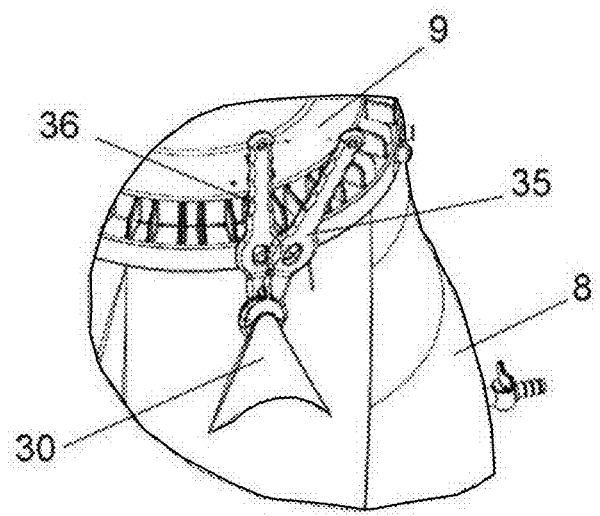
FIG. 13 is a depiction of how the special keys are fitted to the lower and upper parts of the device and of how the hermetic closure is achieved.
Figure 14:
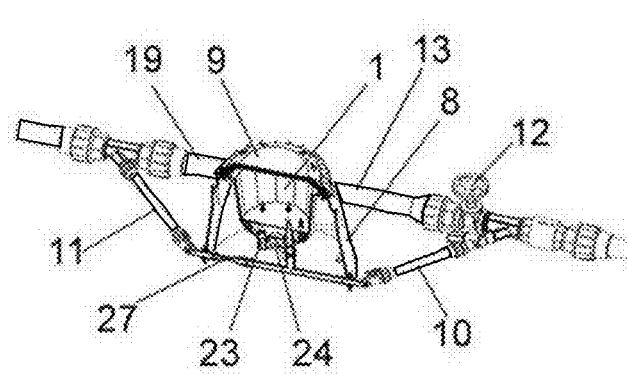
FIG. 14 is a section of the device showing how the system works in its entirety.

Returning to the mentioned flanges (20) of the opening of the body of the container holder, these flanges are complementary to other flanges (28) existing in its lid, which lid has inner ribs (29) pressing on the container (1) to achieve its complete perforation. Outer protrusions (30) allow the coupling of a special key (35), shown in detail in FIG. 12, provided with a hole (36) for coupling to said protrusions (30) and with a sort of fork (37) intended to act, by leverage, on the outer protrusions (20') existing in the body (8), as shown in FIG. 13, to achieve the suitable pressure in the bayonet type closure of the lid (9) on the body (8).

In this closure of the container holder, with the container (1) therein, the flanges (20) of the lower part or body (8) fit perfectly in a wedged manner with the flanges (28) of the lid (9), while at the same time the inner ribs (29) of said lid press the container (1) to assure the complete perforation thereof.

The tightness in the closure of the container holder is assured by means of a gasket (31).

Furthermore, a tight space for housing the handle (32) of the container (1) is generated between the base (8) and the lid (9) of the container holder.

Figure 11:
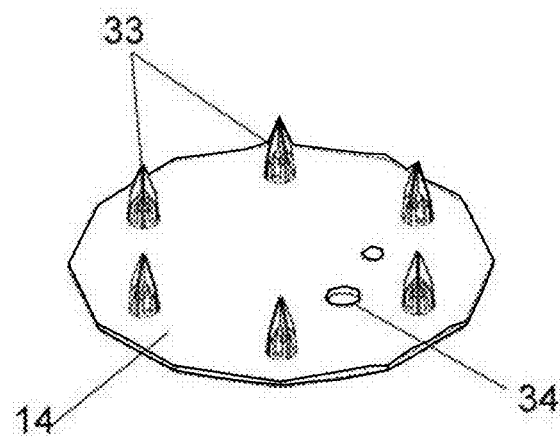
FIG. 11 is a depiction of the perforation plate, which indicates the hole where the water injector element will be fitted, determining its unique position inside the extraction cavity.

Returning to the perforation plate (14) and as shown in FIG. 11), it is provided with relief elements (33) in charge of the perforation of the weakened portions (5) of the bottom of the container (1), further incorporating a hole (34) which will determine its unique position inside the extraction cavity of the base of the device, since the water injector element will be inserted therein.

The invention claimed is:

1. A system for supplying fertilizers through irrigation water, using a solid fertilizer housed inside a hermetically closed container, coupleable inside a container holder, practicable and provided with perforation means for said container when the container is closed, in order for irrigation water to pass therethrough, which water progressively dissolves the fertilizer and continuously supplies the dissolved fertilizer to a general supply pipe, wherein a bypass aiding a main pipe is established, said bypass incorporates a pressure regulator assembly (22), formed by a pressure controller (23), a check valve (24), a safety valve (25) and a normally closed depressurization valve (26), as well as a fertilizer solution injector element (27), which acts by the Venturi effect and which is likewise connected to an upper portion of the a lower part (39) for the evacuation of air, all this such that the injection pressure remains constant regardless of the pressure fluctuations in a main irrigation pipe (13), in which an injection regulator valve (12) is placed.

2. The system for supplying fertilizers through irrigation water according to claim 1, wherein a body (8) of the container holder is provided at its bottom with a perforation plate (14), with bosses (33) for breaking weakened portions (5) established at the bottom of the container (1), such that through said bottom both the entrance of water and the exit of water-fertilizer solution are established through said bottom.

3. The system for supplying fertilizers through irrigation water according to claim 2, wherein a lid of the container holder (9) is coupled to the body (8) thereof by means of complementary flanges (20-28), in a bayonet closure, the lid (9) having protrusions (30) for coupling a key which acts by leverage on protrusions (20') of the body (8) in order to enhance a tightening, wherein a housing fitted to a handle (32) of the container is furthermore established between the body (8) and the lid (9) of the container holder, and the container (1) itself.

4. The system for supplying fertilizers through irrigation water according to claim 2, wherein in a wall of the body (8) of the container holder there is established a peephole (17) which allows visually controlling the depletion of the fertilizer.

\* \* \* \* \*